United States Patent
Mattos et al.

(10) Patent No.: US 9,135,234 B1
(45) Date of Patent: Sep. 15, 2015

(54) COLLABORATIVE GENERATION OF DIGITAL CONTENT WITH INTERACTIVE REPORTS

(75) Inventors: Camilo Mattos, Los Angeles, CA (US); Santiago Becerra, Del Mar, CA (US); Quinton Alsbury, Venice, CA (US)

(73) Assignee: MeLLmo, Inc., Solana Beach, CA (US)

(*) Notice: Subject to any disclaimer, the term of this patent is extended or adjusted under 35 U.S.C. 154(b) by 418 days.

(21) Appl. No.: 13/473,080

(22) Filed: May 16, 2012

Related U.S. Application Data (60) Provisional application No. 61/486,750, filed on May 16, 2011.

(51) Int. Cl.
  *G06F 17/25* (2006.01)
(52) U.S. Cl.
  CPC .................................. *G06F 17/25* (2013.01)
(58) Field of Classification Search
  USPC ......................................... 715/243, 249, 253
  See application file for complete search history.

(56) References Cited

U.S. PATENT DOCUMENTS

| | | | |
|---|---|---|---|
| 5,809,266 A * | 9/1998 | Touma et al. | 715/764 |
| 6,052,514 A * | 4/2000 | Gill et al. | 715/733 |
| 6,185,587 B1 * | 2/2001 | Bernardo et al. | 715/234 |
| 6,826,727 B1 * | 11/2004 | Mohr et al. | 715/235 |
| 7,007,232 B1 * | 2/2006 | Ross et al. | 715/208 |
| 7,577,906 B2 * | 8/2009 | Friedrichowitz et al. | 715/246 |
| 7,937,663 B2 * | 5/2011 | Parker et al. | 715/751 |
| 8,195,787 B2 * | 6/2012 | Bimson et al. | 709/223 |
| 8,453,052 B1 * | 5/2013 | Newman et al. | 715/255 |
| 2002/0130868 A1 * | 9/2002 | Smith | 345/440 |
| 2002/0161603 A1 * | 10/2002 | Gonzales | 705/1 |
| 2004/0205659 A1 * | 10/2004 | Barry et al. | 715/530 |
| 2005/0289461 A1 * | 12/2005 | Amado et al. | 715/530 |
| 2006/0259524 A1 * | 11/2006 | Horton | 707/201 |
| 2008/0114847 A1 * | 5/2008 | Ma et al. | 709/206 |
| 2009/0006936 A1 * | 1/2009 | Parker et al. | 715/200 |
| 2010/0235403 A1 * | 9/2010 | Ney de Souza et al. | 707/802 |
| 2012/0017156 A1 * | 1/2012 | Broda et al. | 715/736 |
| 2013/0283147 A1 * | 10/2013 | Wong et al. | 715/234 |

* cited by examiner

*Primary Examiner* — Andrew Dyer
(74) *Attorney, Agent, or Firm* — Fenwick & West LLP (57) ABSTRACT

Collaborative generation of digital content with interactive reports is enabled. An editor selects a layout and assigns story blocks to authors. Story blocks include a textual component and an interactive report component. In one embodiment, the interactive report includes static data captured at authorship time. In another embodiment, the interactive report includes live data updated at read time. After an author creates a story block, it is submitted to the editor for review and approval. The editor may send the story block back to the author for subsequent editing prior to approval. Once the editor approves all of the content from all of the authors, the editor can publish the content. The resulting content is published as an interactive report or magazine, enabling readers to see not just the story content of the publication, but to interact with the reports and underlying data.

17 Claims, 10 Drawing Sheets

COLLABORATIVE GENERATION OF DIGITAL CONTENT WITH INTERACTIVE REPORTS

CROSS-REFERENCE TO RELATED APPLICATION

This application claims the benefit of U.S. Provisional Application No. 61/486,750, entitled "Collaborative Generation of Digital Content with Interactive Reports," filed May 16, 2011, which is incorporated herein by reference in its entirety.

BACKGROUND

1. Field

The disclosure generally relates to collaborative generation of digital content with interactive reports. In particular, described embodiments enable creation of interactive analytic reports embedded into multidimensional pages.

2. Description of Related Art

Digital content is typically edited either by a single editor, or without any access control. Digital editions of media publications such as newspapers, magazines, annual reports, and the like are typically scanned or high-resolution versions of the same documents published on paper.

SUMMARY

Collaborative generation of digital content with interactive reports is enabled. An editor selects a layout and assigns each of a plurality of stories to an author. The author accepts or rejects the assignment. Stories typically include a textual component and an interactive report component. In one embodiment, the interactive report includes static data captured at authorship time. In another embodiment, the interactive report includes live data updated at read time. After an author creates a story, it is submitted to the editor for review and approval. The editor has the opportunity to send the story back to the original owner for subsequent editing prior to approval. Once the editor approves all of the content from all of the authors, the editor can publish the content. The resulting content is published as an interactive report or magazine, enabling readers to see not just the story content of the publication, but to interact with the reports and underlying data.

DETAILED DESCRIPTION

Figure 1:
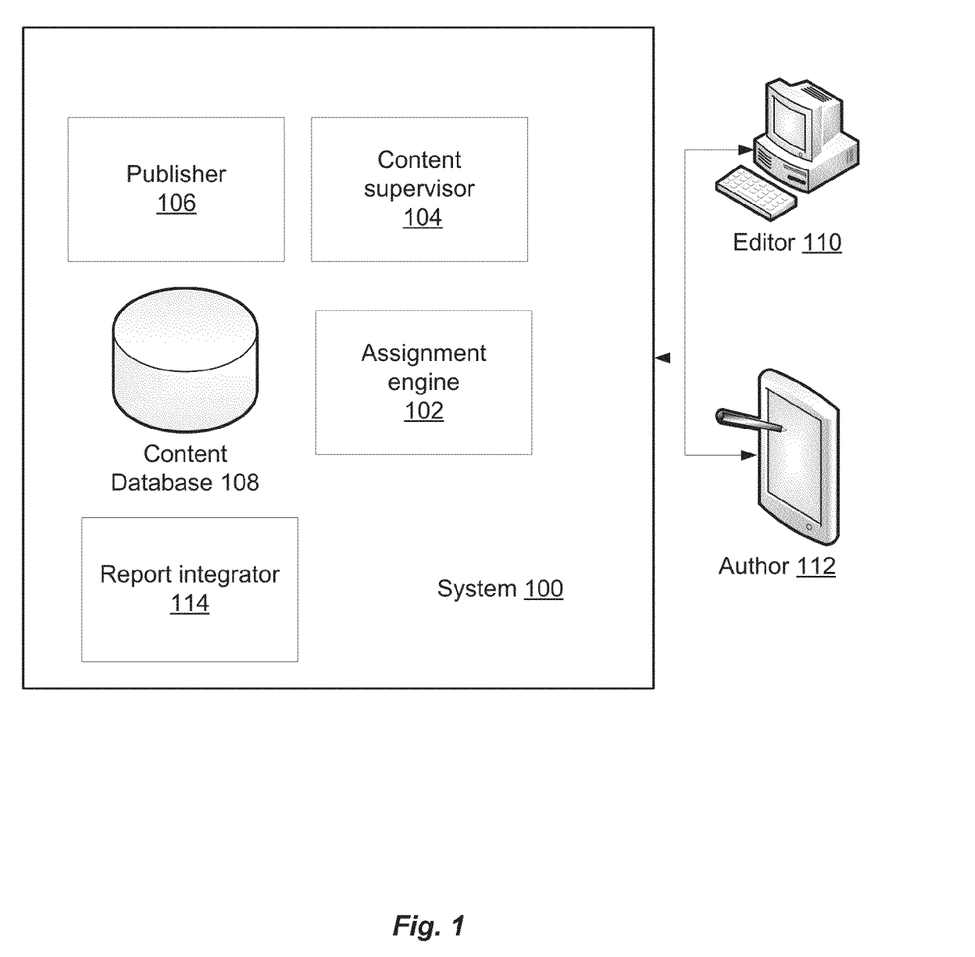
FIG. 1 is a block diagram of a system for collaborative generation of digital content with interactive reports in accordance with one embodiment.

FIG. 1 is a block diagram of a system 100 for collaborative creation of an interactive report in accordance with one embodiment. System 100 includes an assignment engine 102, content supervisor module 104, publisher module 106, content database 108, and report integrator 114. Also included in FIG. 1 is an editor 110 and author 112.

Assignment engine 102 maintains information about which assignments have been made to which authors, and the status of each assignment. Content supervisor 104 controls access to content stored in content database 108, and provides an interface to editor 110 and author 112 for editing and authoring of content. Report integrator 114 facilitates integration of interactive reports into content stories. Publisher module 106 terminates the authoring, editing and assignment phases of the report and initiates the publication cycle. The function of each module is described further below.

Editor 110 is responsible for assigning tasks to authors 112, reviewing submitted content, and approving submitted content. Editor 110 is also responsible for layout of the digital report. Authors 112 receive assignments to contribute content, and either accept or reject the assignments. Once created, authors 112 submit their content for review by editor 112 and subsequent publication. Although only one editor 110 and one author 112 are included in FIG. 1, multiple instances of each may interact with system 100.

Figure 2:
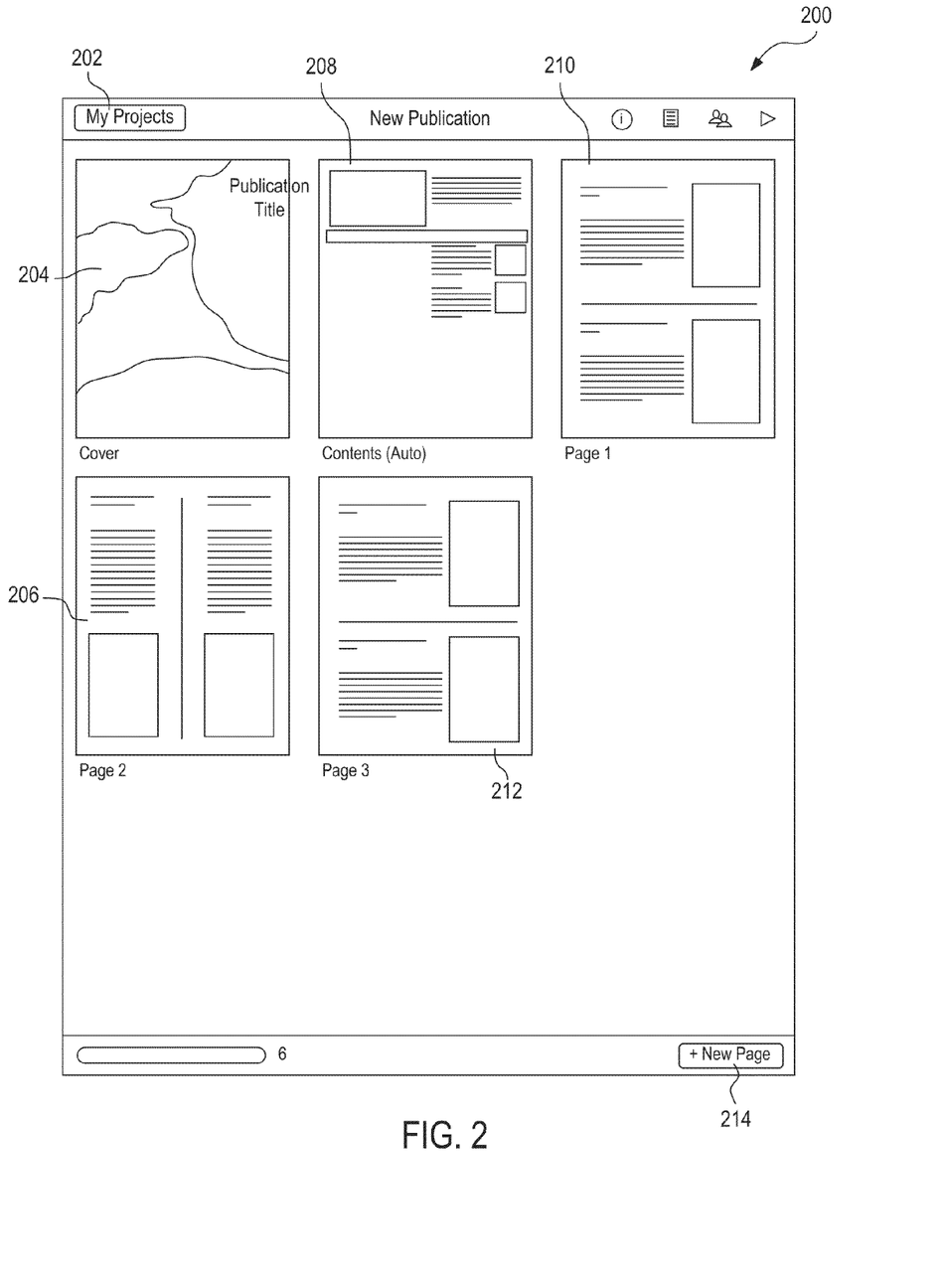
FIG. 2 illustrates a layout interface according to one embodiment.

FIG. 2 illustrates a layout interface 200 according to one embodiment. Editor 110 uses layout interface 200 to add pages to the digital publication, e.g., by selecting the "+New Page" button 214. Another control element, "My Projects" 202 returns the view to a list of all available publications. Within the layout interface 200, each of the pages 204, 208, 210, 206, 212 currently included in the publication layout is displayed. Editor 110 can select one of the pages, for example by double-tapping or double-clicking on the page.

Figure 3:
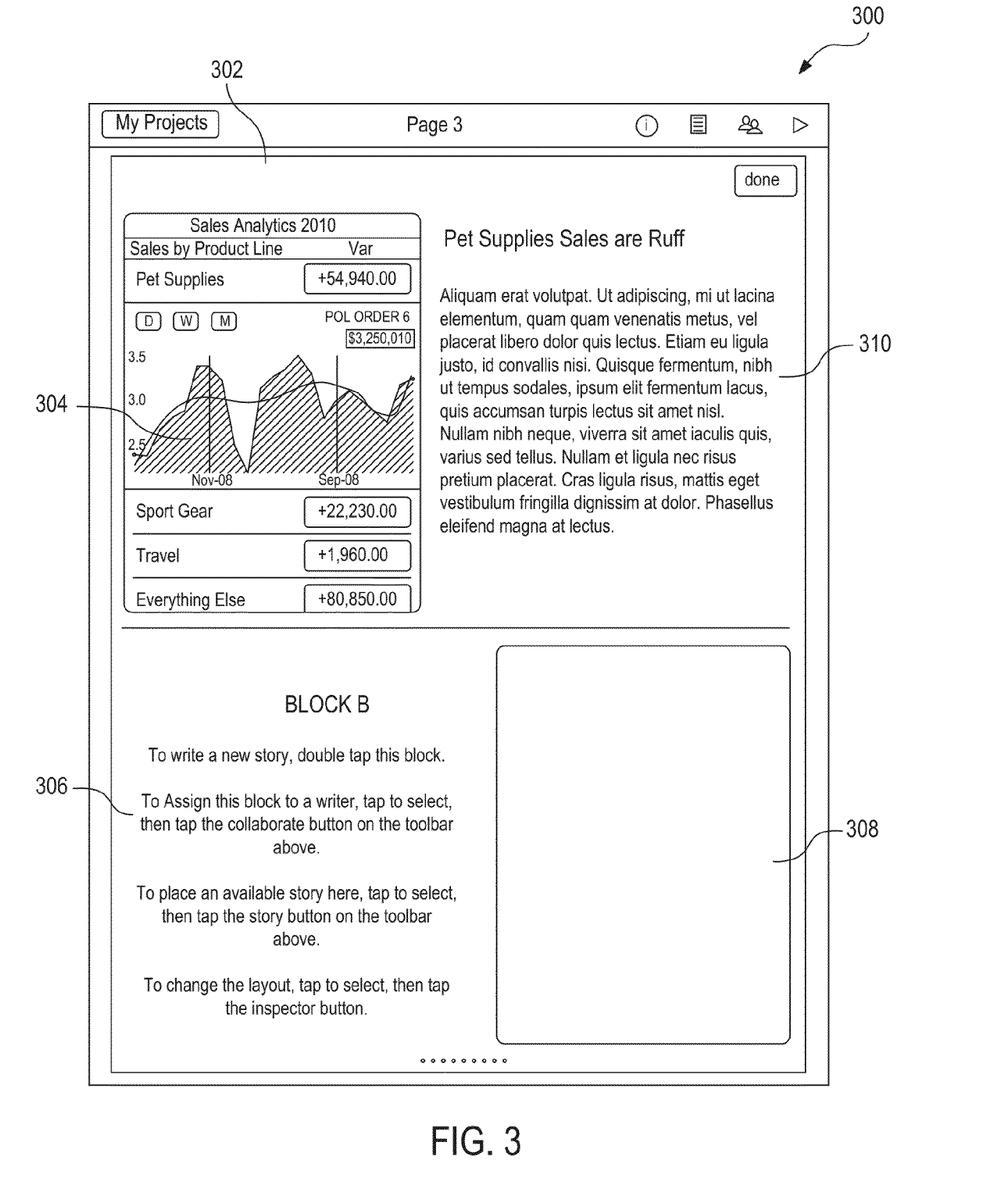
FIG. 3 illustrates a layout and assignment view of a page in accordance with one embodiment.

FIG. 3 illustrates a layout and assignment view of a page 300 in accordance with one embodiment. The displayed page 300 includes a first story block 302 and a second story block 306. The first story block 302 has already been authored, and includes authored story content 310 and integrated report 304. The second story block 306 does not include any content, but does illustrate a default layout, including a story text area on the left and an integrated report area 308 to the right. The default layout in one embodiment is created at implementation time, and in various embodiments is customizable by editor 110.

Figure 4:
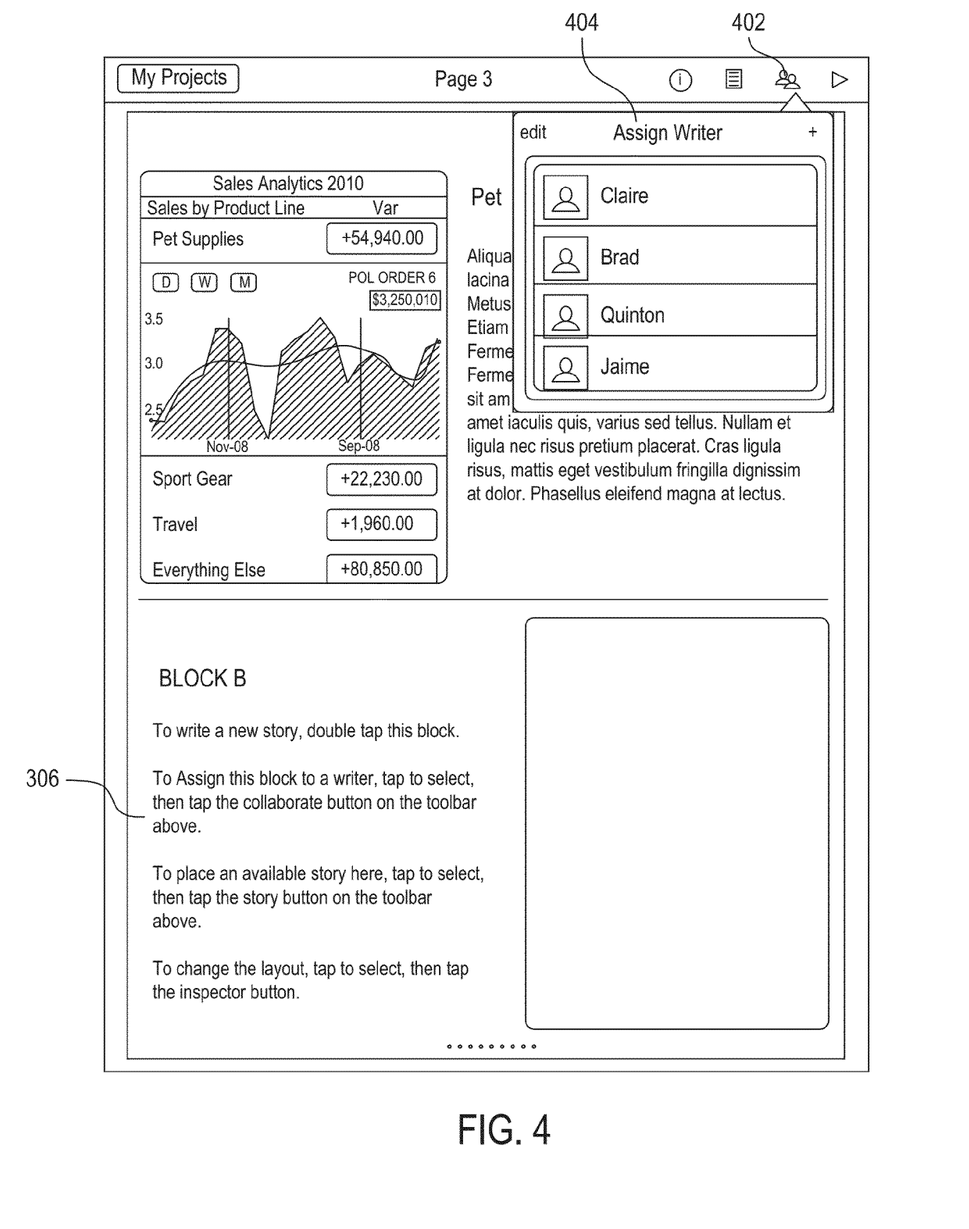
FIG. 4 illustrates a manner in which an editor assigns a story in one embodiment.
Figure 5:
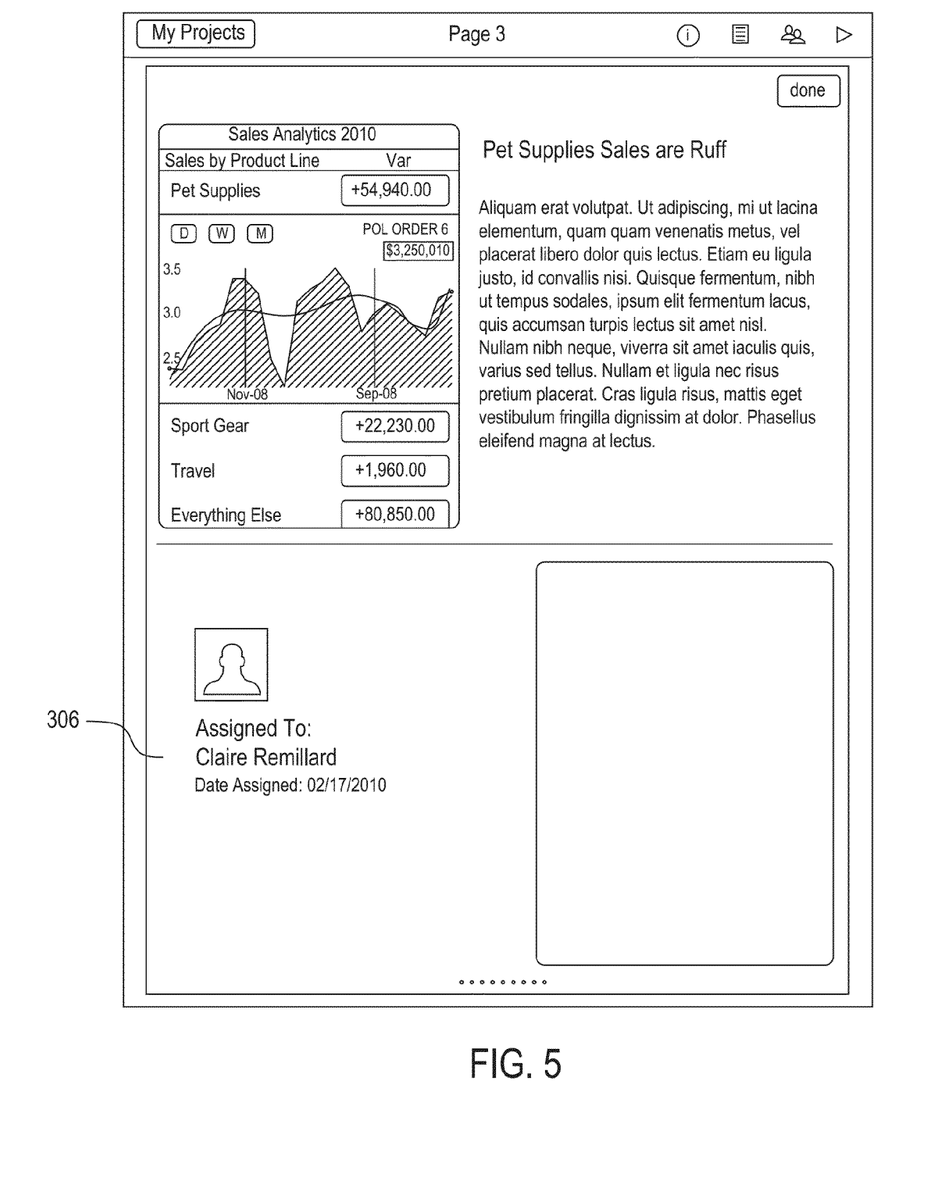
FIG. 5 is a screen shot including a story block assigned to an author in accordance with one embodiment.

FIG. 4 illustrates a manner in which editor 110 assigns a story in one embodiment. First, the editor 110 selects the block on the page to be assigned, in this case block 306. Editor 110 next activates the "assign writer" control 402, which in the illustrated embodiment is an icon at the top of the display. Activating the control causes assignment engine 102 to display a list 404 of authors 112 to whom the story can be assigned. In one embodiment, a control icon such as a "+" sign enables addition of an author not already listed. When an author 110 is selected, assignment engine 102 in one embodiment contacts the author 112, e.g., via e-mail, pager, telephone, or client software, to inform the author 112 of the assignment. In one embodiment, the author 112 may accept or decline the assignment. Once the assignment has been made, the story block area 306 is updated to reflect the assignment, as is shown in FIG. 5.

Figure 6:
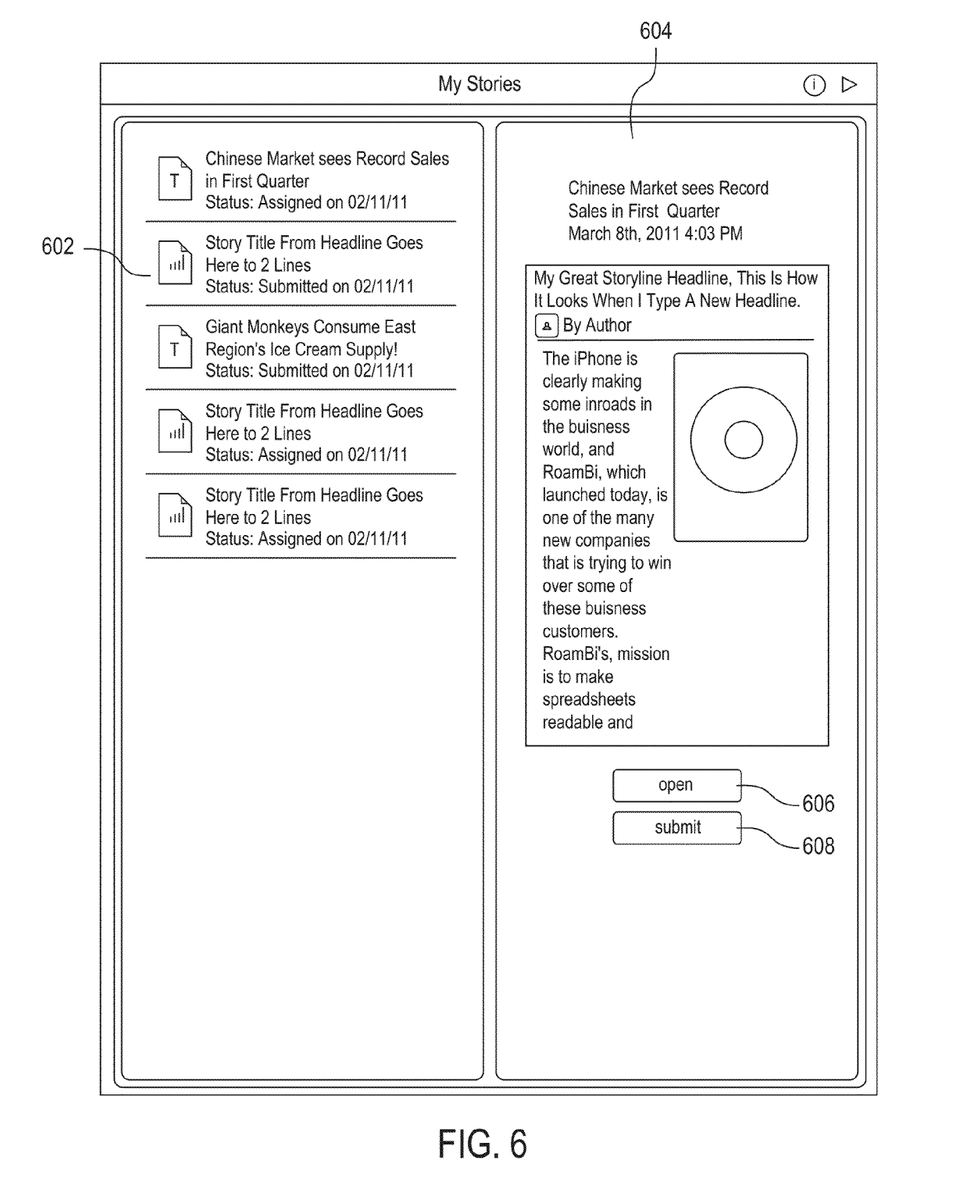
FIG. 6 is a screen shot illustrating an author's assignment view in accordance with one embodiment.

FIG. 6 is a screen shot illustrating an author's assignment view. Assignment engine 102 maintains a mapping between authors 112 and story blocks. In a first region 602, the author's assignment view lists each of the assignments made to and accepted by the author 112, the editor who made the assignment, when the assignment was accepted, when the content was last edited, and whether the assignment has been assigned, submitted or accepted. When a particular assignment is selected, e.g., by highlighting or clicking, additional information about the assignment is displayed in a second region 604, including, for example, a preview of the content. Additional controls enable the author 112 to open 606 the content to begin or continue editing, or to submit 608 the content once complete.

As noted, a story block in various embodiments includes both story text 310 (FIG. 3) and an integrated interactive report 304. The interactive report enables a reader of the published content to interact with the report and its underlying data. In various embodiments, interactions include viewing, analyzing, modifying and sharing the report visualization. Examples of suitable interactive reports include those provided by MeLLmo Inc. of Solana Beach, Calif. In one embodiment, author 112 uses report integrator 114 to select from among available reports for insertion into the story block. Report integrator 114 in one embodiment makes a copy of the report available to content supervisor 104, which inserts the copy of the report into the story block. In this manner, the report continues to be interactive, but the underlying data from which the report was created is a static copy. In an alternative embodiment, report integrator 114 links the integrated report to a live data source, such that if the underlying data changes, the published report changes as well.

Figure 7:
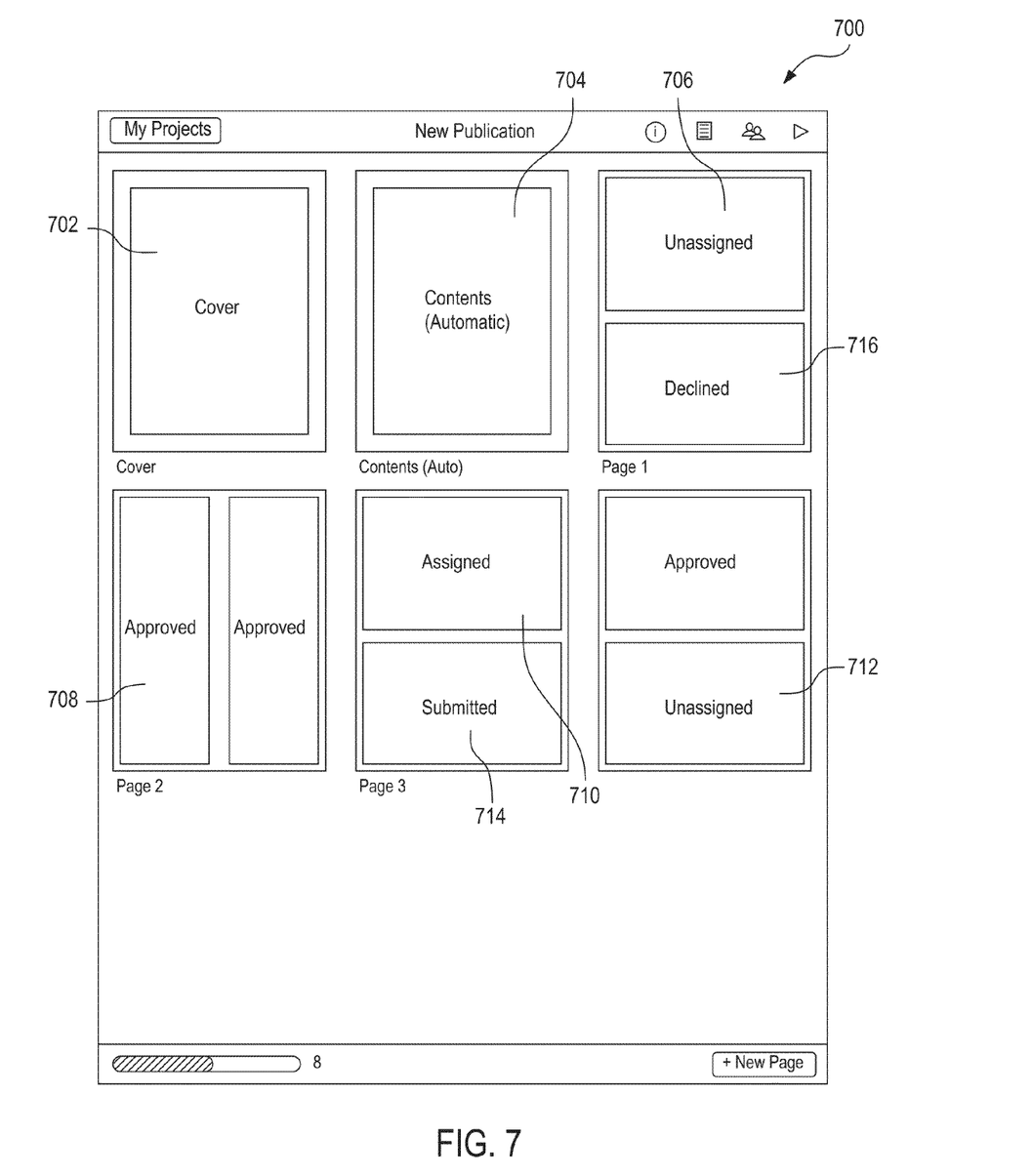
FIG. 7 illustrates a layout interface according to one embodiment.

FIG. 7 provides another example of a layout interface 700 in accordance with one embodiment. In this view, each story block is labeled and/or color coded to illustrate its status. For example, cover 702, table of contents 704 and page 708 are colored green, indicating that their contents have been approved by editor 110 and are ready for publication. Story blocks 706 and 712 are grey and marked "Unassigned," indicating that the story blocks have not yet been assigned to an author. Story block 714 is orange, and marked as "Submitted," indicating that author 112 has submitted content for review by editor 110. Story block 710 is blue and marked "Assigned," indicating that an author 112 has been assigned to prepare the content for that story block. Finally, story block 716 is colored red and marked "Declined," indicating that the author 112 assigned to write the story has declined to prepare it. Note that the particular coloring and wording above is only an example, and is at the discretion of the implementer.

Figure 8:
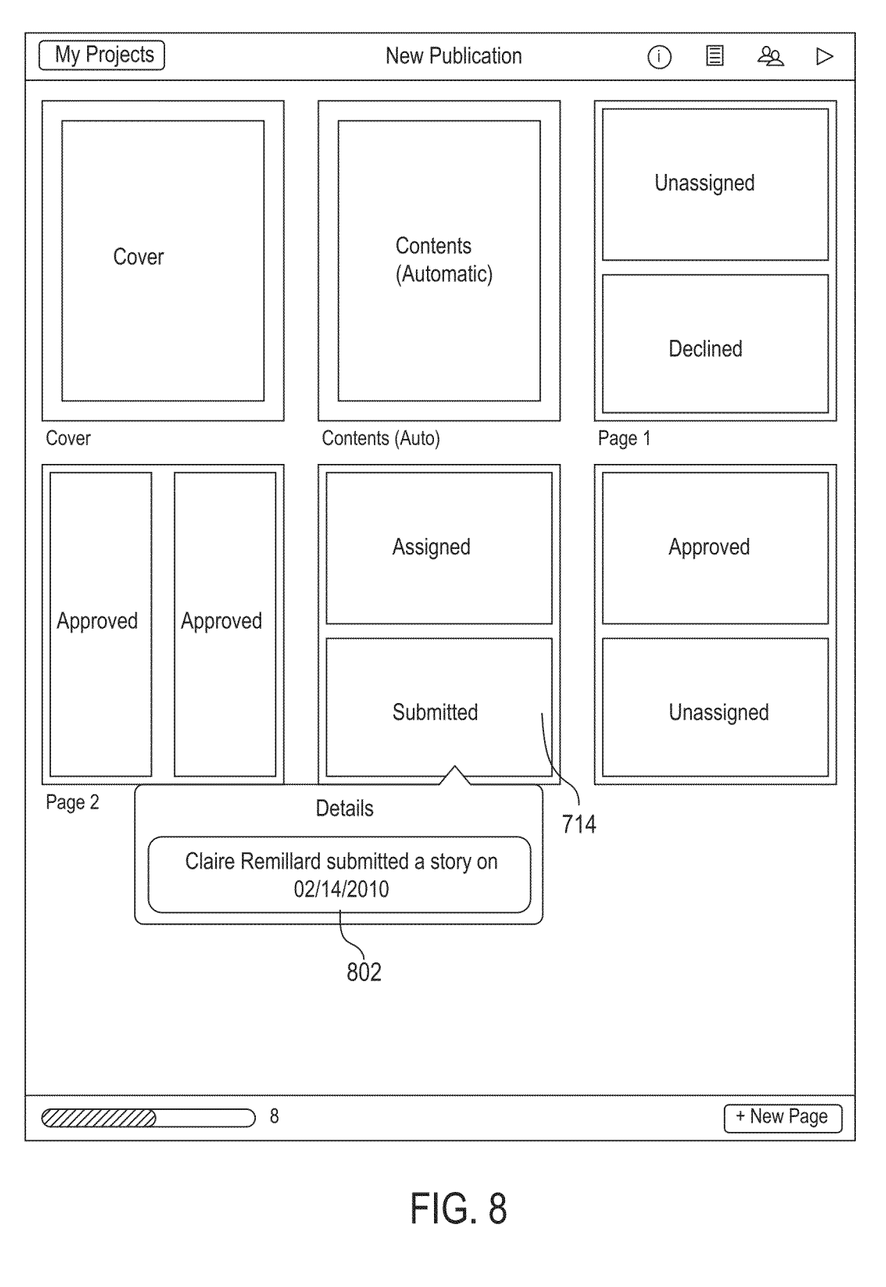
FIG. 8 illustrates a layout interface according to one embodiment.

In one embodiment, editor 110 can obtain more information about any of the story blocks by mousing over, pointing to, touching or otherwise gesturing to a particular story block. Referring to FIG. 8, it can be seen that author "Claire Remillard" submitted a story on Feb. 14, 2010 as indicated in information bubble 802.

Figure 9:
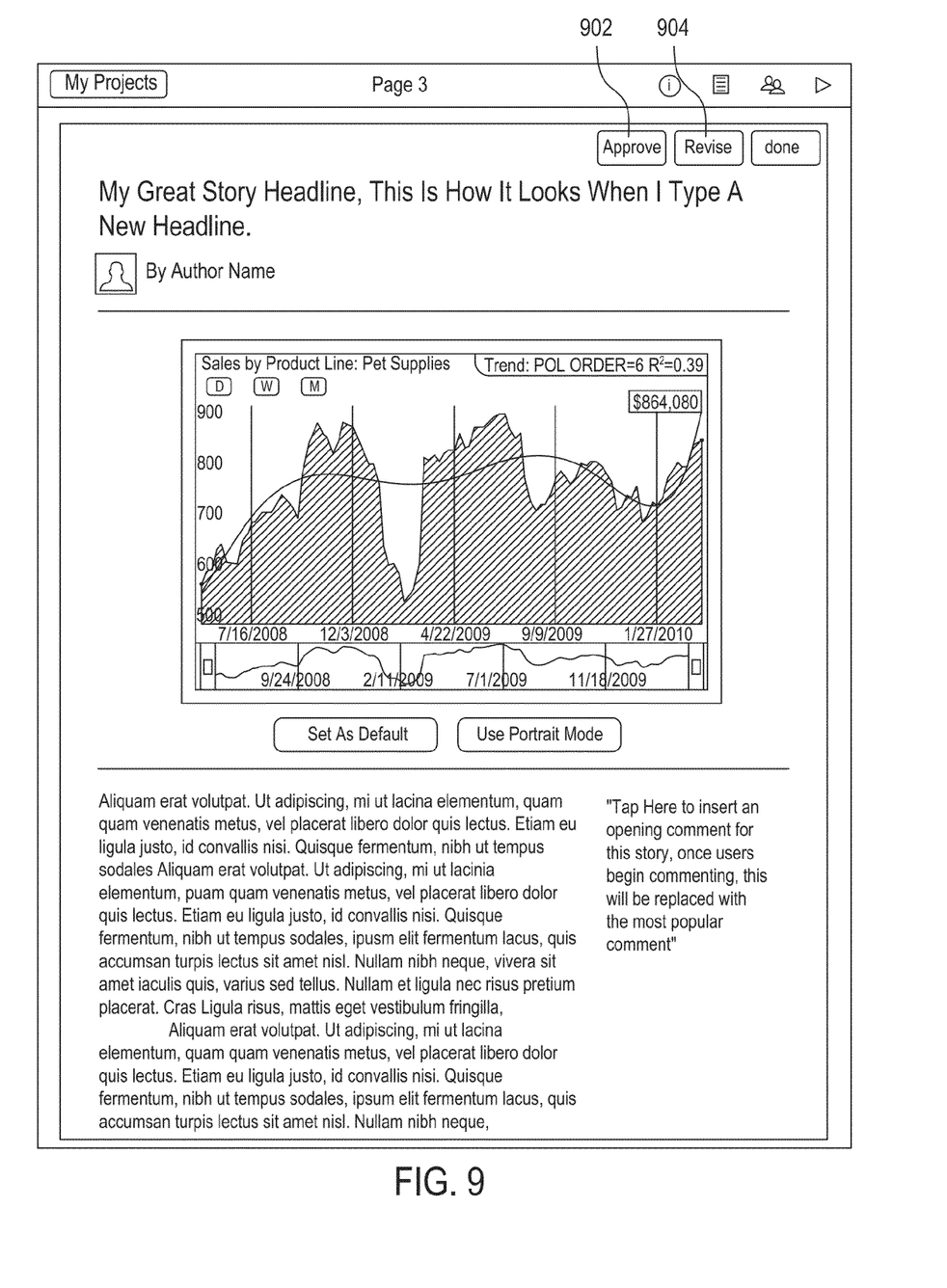
FIG. 9 illustrates an editor user interface for approving a submitted story in accordance with one embodiment.

When an author 112 submits a story for review by editor 110, assignment engine 102 marks the status of the assignment as "Submitted," and content supervisor 104 informs editor 110 that the story is available for review, e.g., via e-mail or through a dashboard interface of system 100. Referring to FIG. 9, editor 110 views the submitted content, and using interface controls either approves 902 or revises 904 the story. If the editor 110 revises the story, revisions and comments are returned to author 112 for execution of the changes. If editor 110 approves the story, assignment engine 102 marks the story as accepted, and content supervisor 104 locks in the content as ready for publication.

Figure 10:
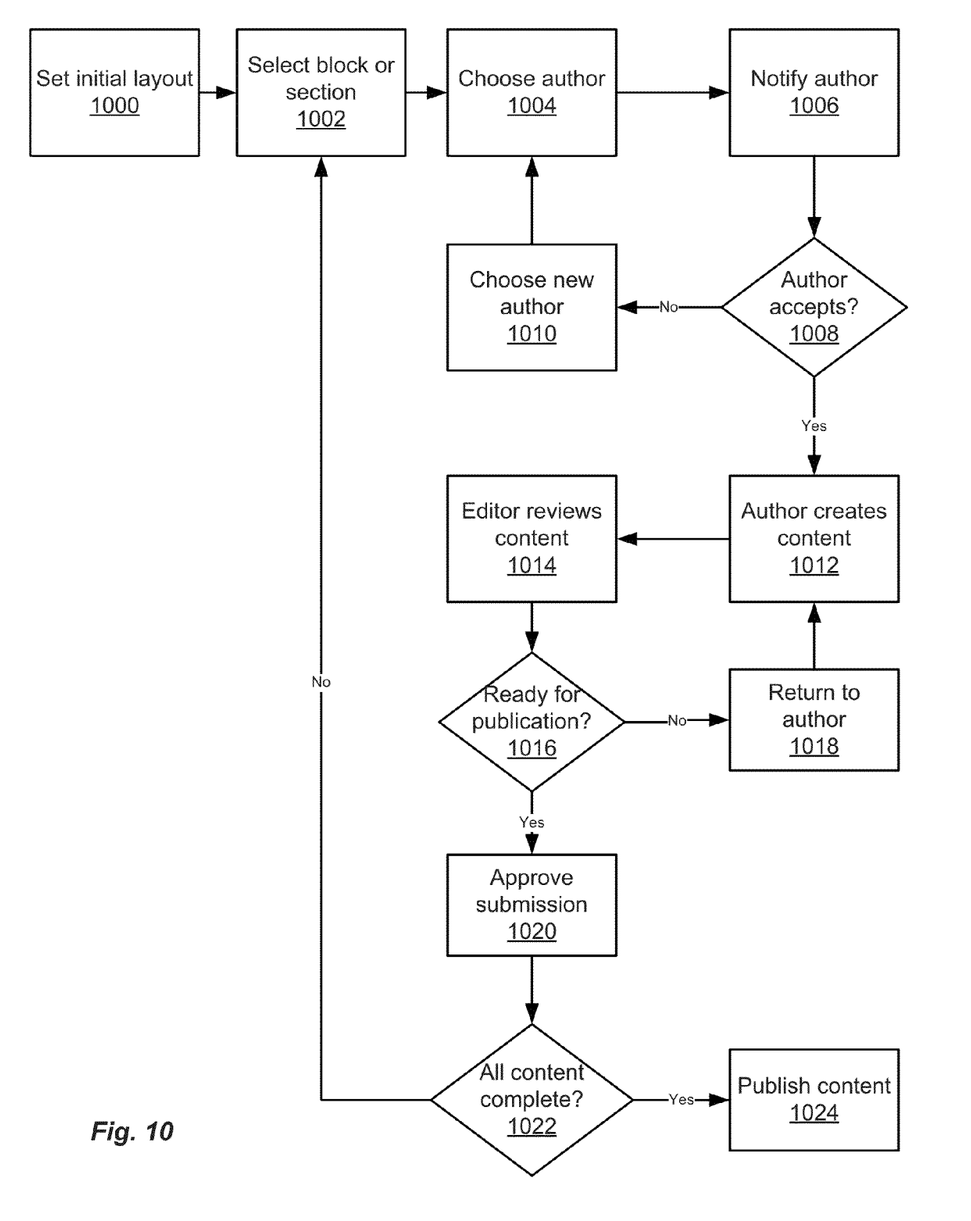
FIG. 10 illustrates steps in a method for collaborative generation of digital content with interactive reports in accordance with one embodiment.

FIG. 10 is a flowchart illustrating a method for collaborative creation of an interactive digital publication in accordance with one embodiment. Editor 110 sets 1000 an initial layout, including number of pages, arrangement of story blocks within each page, and the like. In one embodiment, editor 110 creates the layout from scratch. In alternative embodiments, predefined templates are available. Once the layout has been selected 1000, editor 110 then selects 1002 a particular story block to assign, as described above with respect to FIG. 4. Editor 110 then chooses 1004 an author 112 from the list of available authors 112, or adds a new author name to the list. Once the selection is made, assignment engine 102 creates a mapping from the story block to the author 112, and notifies 1006 the author 112 of the assignment, e.g., by e-mail, text, telephone or via a client interface. If 1008 author 112 accepts the assignment, content supervisor 104 makes the story block available for editing by author 112. In one embodiment, only an author 112 assigned to a particular story block can edit content for that story block, in order to provide appropriate security and avoid editing collisions. If the author 112 does not accept 1008 the assignment, editor 110 is notified and chooses 1010 a different author to whom to assign the story.

Author 112 then creates 1012 the requested content, and includes one or more interactive reports, which are then inserted by report integrator 114. Once the author 112 submits the story, assignment engine 102 marks the story as submitted and notifies editor 110. Content supervisor 104 in one embodiment then locks the content so that only editor 110 can make further changes. Editor 110 then reviews 1014 the content, and determines whether 1016 it is ready for publication. If so, editor 110 approves 1020 the submission, and assignment engine 102 changes the status to "accepted". Alternatively, if the editor 110 wants the author 112 to make revisions to the story, the story is returned 1018 to the author, assignment engine 102 changes the status to "assigned," and content supervisor 104 locks the content for editing by author 112.

Once editor 110 has approved 1022 all content, the content can be published 1024, e.g., in the format of a digital magazine, which includes embedded interactive analytics. Publisher 106 includes logic to make the publication available either to a distribution list, via a URL on a publisher web site, or through manual distribution, e.g., e-mail. In one embodiment, viewers read the published content using client software such as software available from MeLLmo Inc. adapted for such a purpose. In various embodiments, publisher 106 produces revised versions of the publication in response to updates provided by editor 110, for example if an error is detected after the initial publication. In various embodiments, consumers subscribe to a notification system and receive the update automatically, e.g., by syncing a device, an over-the-air update, via e-mail, etc.

In addition to the embodiments specifically described above, those of skill in the art will appreciate that the invention may additionally be practiced in other embodiments.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention. Various modifications, changes and variations, which will be apparent to those skilled in the art, may be made in the arrangement, operation and details of the method and apparatus disclosed herein without departing from the spirit and scope defined in the appended claims.

We claim:

1. A computer implemented method for collaborative generation of digital reports, the method comprising:
  receiving, by a computer from an editor, information describing a layout of a digital report to be published as a plurality of pages, each page having one or more associated story blocks;
  configuring for display a publication layout of the digital report, the publication layout displaying the plurality of pages of the digital report;
  for each story block:
    receiving a location of the story block in the digital report, the location identifying at least a portion of a page from the plurality of pages, the location identified using the publication layout configured for the digital report;
    sending, by the computer, an assignment request for the story block to an author;
    receiving, by the computer, an acceptance of the assignment request from the author for the story block;
    receiving, by the computer, from the author, content for the story block, the content comprising one or more of textual information and an embedded interactive report, the embedded interactive report including visualization of a chart based on a live data source;
  receiving an approval from the editor for each story block;
  responsive to receiving, by the computer, the approval from the editor for each story block, configuring, by the computer, the digital report for publication;
  publishing the digital report as an interactive magazine to users belonging to a distribution list, wherein the published interactive magazine is configured to update visualization of the chart at read time using the latest underlying data of the live data source, the published interactive magazine further configured to allow a reader to:
    receiving a first interaction with the report, the first interaction requesting modification of the visualization of the chart;
    receiving a second interaction with the report, the second interaction requesting sharing of the modification of the visualization of the chart; and
    responsive to receiving the second interaction, sharing the modification of the visualization from the reader with another reader;
  receiving a revised version of the digital report comprising updated story blocks; and
  publishing the revised version of the digital report to the users belonging to the distribution list.

2. The computer implemented method of claim 1, wherein the interactive magazine is further configured to allow a reader to:
  view story content of the published interactive magazine; and
  interact with one or more reports embedded in the interactive magazine.

3. The computer implemented method of claim 1, further comprising for each story block:
  sending, by the computer, an assignment request to a first author;
  receiving a rejection of the assignment request for the story block from the first author; and
  responsive to the first author rejecting the story block, sending by the computer, an assignment request to a second author.

4. The computer implemented method of claim 1, the method comprising:
  responsive to receiving, by the computer, a request for revision from the editor for a story block assigned to an author:
    sending, by the computer, information describing the request for revision to the assigned author; and
    receiving, by the computer, an updated version of the story block from the assigned author.

5. The computer implemented method of claim 1, wherein the embedded interactive report is a first interactive report, wherein content for at least one story block comprises a static copy of data from a second interactive report.

6. The computer implemented method of claim 1, wherein the digital report comprises a plurality of pages, each page associated with one or more story blocks.

7. The computer implemented method of claim 1, further comprising:
configuring, by the computer, for display, a user interface showing a status of each story block of the digital report, the status indicating whether the story block is one of, unassigned, submitted, assigned, or declined; and
sending for display, to a client device, information describing the configured user interface.

8. A system for collaborative generation of digital reports, the system comprising:
a computer processor; and
a computer-readable non-transitory storage medium storing instructions for:
receiving from an editor, information describing a layout of a digital report configured to be published as a plurality pages, each page having one or more associated of story blocks;
configuring for display a publication layout of the digital report, the publication layout displaying the plurality of pages of the digital report;
for each story block:
receiving a location of the story block in the digital report, the location identifying at least a portion of a page from the plurality of pages, the location identified using the publication layout configured for the digital report;
sending an assignment request for the story block to an author;
receiving an acceptance of the assignment request from the author for the story block;
for each story block:
receiving from the author, content for the story block, the content comprising one or more of textual information and an embedded interactive report, the embedded interactive report including visualization of a chart based on a live data source; and
receiving an approval from the editor for each story block;
configuring the digital report for publication as an interactive magazine to users belonging to a distribution list responsive to receiving the approval from the editor for each story block, wherein the published interactive magazine is configured to update visualization of the chart at read time using the latest underlying data of the live data source, the interactive magazine further configured to allow a reader to:
receiving a first interaction with the report, the first interaction requesting modification of the visualization of the chart;
receiving a second interaction with the report, the second interaction requesting sharing of the modification of the visualization of the chart; and
responsive to receiving the second interaction sharing the modification of the visualization from the reader with another reader;
receiving a revised version of the digital report comprising updated story blocks; and
publishing the revised version of the digital report to the users belonging to the distribution list.

9. The system of claim 8, wherein the interactive magazine is further configured to allow a reader to:
view story content of the published interactive magazine; and
interact with one or more reports embedded in the interactive magazine.

10. The system of claim 8, wherein the computer readable storage medium further stores instructions for:
for each story block:
sending an assignment request to a first author;
receiving a rejection of the assignment request for the story block from the first author; and
responsive to the first author rejecting the story block, sending an assignment request to a second author.

11. The system of claim 8, wherein computer readable storage medium further stores instructions for:
responsive to receiving, a request for revision from the editor for a story block assigned to an author:
sending information describing the request for revision to the author; and
receiving an updated version of the story block from the author.

12. The system of claim 8, wherein the embedded interactive report is a first interactive report, wherein content for at least one story block comprises a static copy of data from a second interactive report.

13. A computer program product having a non-transitory computer-readable storage medium storing instructions for:
receiving from an editor, information describing a layout of a digital report configured to be published as a plurality of pages, wherein each page having one or more associated story blocks;
configuring for display a publication layout of the digital report, the publication layout displaying the plurality of pages of the digital report;
for each story block:
receiving location of the story block in the digital report, the location identifying at least a portion of a page from the plurality of pages, the location identified using the publication layout configured for the digital report;
sending an assignment request for the story block to an author;
receiving an acceptance of the assignment request from the author for the story block;
for each story block:
receiving from the author, content for the story block, the content comprising one or more of textual information and an embedded interactive report, the embedded interactive report including visualization of a chart based on a live data source; and
receiving an approval from the editor for each story block;
configuring the digital report as an interactive magazine for publication to users belonging to a distribution list responsive to receiving the approval from the editor for each story block, wherein the published interactive magazine is configured to update visualization of the chart at read time using the latest underlying data of the live data source, the interactive magazine further configured to allow a reader to:
receiving a first interaction with the report, the first interaction requesting modification of the visualization of the chart;
receiving a second interaction with the report, the second interaction requesting sharing of the modification of modifications to the visualization of the chart; and responsive to receiving the second interaction sharing the modification of the visualization from the reader with another reader;

receiving a revised version of the digital report comprising updated story blocks; and publishing the revised version of the digital report to the users belonging to the distribution list.

14. The computer program product of claim 13, wherein the interactive magazine further allows interactions with a reader comprising:

viewing story content of the published interactive magazine; and interacting with one or more reports embedded in the interactive magazine.

15. The computer program product of claim 13, further storing instructions for:

for each story block:

sending an assignment request to a first author;

receiving a rejection of the assignment request for the story block from the first author; and responsive to the first author rejecting the story block, sending an assignment request to a second author.

16. The computer program product of claim 13, further storing instructions for:

responsive to receiving, a request for revision from the editor for a story block assigned to an author:

sending information describing the request for revision to the author; and receiving an updated version of the story block from the author.

17. The computer program product of claim 13, wherein the embedded interactive report is a first interactive report, wherein the content for at least one story block comprises a static copy of data from a second interactive report.

\* \* \* \* \*